US012763615B2

(12) United States Patent
Link

(10) Patent No.: US 12,763,615 B2
(45) Date of Patent: Oct. 13, 2026

(54) LAMINATED CORE AND METHOD FOR THE PRODUCTION OF A LAMINATED CORE

(71) Applicant: Vacuumschmelze GmbH & Co KG, Hanau (DE)

(72) Inventor: Philipp Link, Hanau (DE)

(73) Assignee: Vacuumschmelze GmbH & Co KG, Hanau (DE)

( * ) Notice: Subject to any disclaimer, the term of this patent is extended or adjusted under 35 U.S.C. 154(b) by 319 days.

(21) Appl. No.: 18/440,296

(22) Filed: Feb. 13, 2024

(65) Prior Publication Data

US 2024/0275217 A1 Aug. 15, 2024

(30) Foreign Application Priority Data

Feb. 14, 2023 (DE) ........................ 102023103535.5

(51) Int. Cl.
*C22C 38/10* (2006.01)
*B32B 7/14* (2006.01)
(Continued)

(52) U.S. Cl.
CPC ................ *H02K 1/02* (2013.01); *B32B 7/14* (2013.01); *B32B 15/043* (2013.01); *B32B 15/18* (2013.01);
(Continued)

(58) Field of Classification Search
CPC .. C22C 38/10; B32B 2311/22; B32B 37/1284
See application file for complete search history.

(56) References Cited

U.S. PATENT DOCUMENTS 6,413,351 B1 * 7/2002 Goldman ............ H01F 1/15375 156/305
6,737,784 B2 * 5/2004 Lindquist ................ H02K 1/02 310/216.004
(Continued)

FOREIGN PATENT DOCUMENTS

AT 512931 A4 12/2013
CN 111313585 A 6/2020
(Continued)

OTHER PUBLICATIONS

English machine translation of DE1613312 (Year: 1970).*
(Continued)

*Primary Examiner* — Scott W Dodds
(74) *Attorney, Agent, or Firm* — Dickinson Wright PLLC

(57) ABSTRACT

A method for the production of a laminated core is provided. A plurality of laminations are provided that are made of a soft-magnetic CoFe alloy and that have a first main surface and a second main surface that is located opposite the first main surface. An adhesive is applied to the first main surface of a first of the laminations by means of a printing process. The adhesive is then transferred to a partially cured B-stage. A second main surface of a second of the laminations is stacked on the B-stage adhesive, which is located on the first main surface of the first lamination, thereby forming a stack of loose laminations. The stack or the adhesive in the stack is cured, the adhesive thus being transferred to the fully cured C-stage in order to bond the first and second laminations to one another and so produce the laminated core.

21 Claims, 4 Drawing Sheets

(51) Int. Cl.

| | |
|---|---|
| ***B32B 15/04*** | (2006.01) |
| ***B32B 15/18*** | (2006.01) |
| ***B32B 37/12*** | (2006.01) |
| ***B32B 37/18*** | (2006.01) |
| ***B32B 38/00*** | (2006.01) |
| ***B32B 38/04*** | (2006.01) |
| ***B32B 38/14*** | (2006.01) |
| ***C22C 19/07*** | (2006.01) |
| ***C22C 38/02*** | (2006.01) |
| ***C22C 38/04*** | (2006.01) |
| ***C22C 38/06*** | (2006.01) |
| ***C22C 38/12*** | (2006.01) |
| ***C22C 38/22*** | (2006.01) |
| ***C22C 38/24*** | (2006.01) |
| ***C22C 38/26*** | (2006.01) |
| ***C22C 38/28*** | (2006.01) |
| ***C22C 38/30*** | (2006.01) |
| ***C22C 38/32*** | (2006.01) |
| ***C22C 38/34*** | (2006.01) |
| ***C22C 38/38*** | (2006.01) |
| ***C22C 38/44*** | (2006.01) |
| ***C22C 38/46*** | (2006.01) |
| ***C22C 38/48*** | (2006.01) |
| ***C22C 38/50*** | (2006.01) |
| ***C22C 38/52*** | (2006.01) |
| ***C22C 38/54*** | (2006.01) |
| ***C22C 38/58*** | (2006.01) |
| ***H01F 1/147*** | (2006.01) |
| ***H02K 1/02*** | (2006.01) |
| ***H02K 15/02*** | (2006.01) |

(52) U.S. Cl.

CPC .......... *B32B 37/1292* (2013.01); *B32B 37/18* (2013.01); *B32B 38/0004* (2013.01); *B32B 38/04* (2013.01); *B32B 38/14* (2013.01); *C22C 19/07* (2013.01); *C22C 38/02* (2013.01); *C22C 38/04* (2013.01); *C22C 38/06* (2013.01); *C22C 38/10* (2013.01); *C22C 38/105* (2013.01); *C22C 38/12* (2013.01); *C22C 38/22* (2013.01); *C22C 38/24* (2013.01); *C22C 38/26* (2013.01); *C22C 38/28* (2013.01); *C22C 38/30* (2013.01); *C22C 38/32* (2013.01); *C22C 38/34* (2013.01); *C22C 38/38* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/58* (2013.01); *H01F 1/147* (2013.01); *H02K 15/02* (2013.01); *B32B 2038/0076* (2013.01); *B32B 2038/042* (2013.01); *B32B 2250/05* (2013.01); *B32B 2255/06* (2013.01); *B32B 2255/26* (2013.01); *B32B 2305/72* (2013.01); *B32B 2305/74* (2013.01); *B32B 2307/206* (2013.01); *B32B 2307/208* (2013.01); *B32B 2309/02* (2013.01); *B32B 2309/105* (2013.01); *B32B 2309/12* (2013.01); *B32B 2310/0825* (2013.01); *B32B 2311/22* (2013.01); *B32B 2311/30* (2013.01); *B32B 2457/00* (2013.01); *C22C 2202/02* (2013.01)

(56) References Cited

U.S. PATENT DOCUMENTS

| | | | | |
|---|---|---|---|---|
| 6,772,503 | B1 | 8/2004 | Fathimulla et al. | |
| 2004/0212269 | A1 | 10/2004 | Decristofaro et al. | |
| 2004/0219328 | A1 * | 11/2004 | Tasaki | C22C 38/14 427/127 |
| 2005/0089708 | A1 * | 4/2005 | Maruko | C22C 45/02 428/655 |
| 2005/0152063 | A1 * | 7/2005 | Hara | H01F 1/15366 29/603.01 |
| 2007/0079497 | A1 | 4/2007 | Meacham et al. | |
| 2012/0156441 | A1 * | 6/2012 | Gerster | H01F 1/18 156/60 |
| 2017/0047829 | A1 | 2/2017 | Hasuo | |
| 2023/0064468 | A1 * | 3/2023 | Tanaka | B32B 15/011 |

FOREIGN PATENT DOCUMENTS

| | | | | |
|---|---|---|---|---|
| DE | 1613312 | A1 * | 10/1970 | H01F 27/245 |
| DE | 1588997 | A | 1/1971 | |
| DE | 2151960 | A1 | 4/1973 | |
| DE | 112007003450 | B4 | 2/2010 | |
| DE | 102010017299 | A1 | 12/2010 | |
| DE | 102020125897 | A1 | 4/2022 | |
| EP | 1833145 | A2 | 9/2007 | |
| EP | 1902452 | B1 | 8/2011 | |
| FR | 1432280 | A | 3/1966 | |
| FR | 2791484 | A1 | 9/2000 | |
| FR | 2850678 | A1 | 8/2004 | |
| FR | 2888390 | A1 | 1/2007 | |
| GB | 2271219 | A | 4/1994 | |
| JP | H0576259 | B2 | 10/1993 | |
| JP | 4537712 | B2 | 9/2007 | |
| WO | 2010109272 | A2 | 9/2010 | |

OTHER PUBLICATIONS

Vacuumschmelze GmbH & Co. KG: Vacoflux 48. Hanau, 2022. 2 S.—Firmenschrift. URL: https://vacuumschmelze.de/03_Documents/Brochures/Flyer %20VACOFLUX%2048.pdf [abgerufen am Oct. 11, 2023].

* cited by examiner

LAMINATED CORE AND METHOD FOR THE PRODUCTION OF A LAMINATED CORE

CROSS REFERENCE TO RELATED APPLICATIONS

This U.S. patent application claims priority to DE Patent Application No. 10 2023 103 535.5, filed Feb. 14, 2023, the entire contents of which is incorporated herein by reference in its entirety.

BACKGROUND

1. Technical Field

The present invention relates to a laminated core and to a method for the production of a laminated core.

2. Related Art

Some designs of electric machines have a stator and/or a rotor made of a soft-magnetic material. In some embodiments the stator and/or the rotor are made up of individual metal sheets or laminations stacked one on top of another, a so-called laminated core. The function of these sheets is to conduct the magnetic flux in the sheet plane. In such an arrangement, a high magnetic conductivity (permeability) of the material and the capability to carry the greatest possible flow density (induction) is advantageous in order to increase the performance of the stator and/or the rotor. The materials used for laminated cores for stators and rotors are predominantly silicon-iron (SiFe) materials, i.e. Fe with the addition of 2 to 4 wt. % (Si+Al). For applications in which the greatest possible power density is necessary or desirable, cobalt-iron alloys are also used.

However, in addition to choice of material, manufacturing technology also has an influence on the output of the stator/rotor laminated core and so on the electric machine as a whole. The individual sheets for the laminated core may be made from a strip using various techniques such as punching, laser cutting, water-jet cutting and electrical discharge machining, for example. The joining of the sheets to form the laminated core can also be carried out using a variety of processes, e.g. by applying a continuous laser weld seam, as disclosed in US 2017/047829 A1, for example, or by gluing, as disclosed in EP 1 833 145 A2 and in AT 512 931 A4, for example.

SUMMARY

An object of the invention is, therefore, to provide a laminated core with a good performance that can be assembled more easily and more reliably.

The invention provides a method for the production of a laminated core. A plurality of laminations (individual sheets) made of a soft-magnetic CoFe alloy are prepared. The laminations each have a first main surface and a second main surface that is located opposite the first main surface. An adhesive is applied the first main surface of a first of the laminations by means of a printing process. The adhesive is then transferred to a partially cured B-stage. A second main surface of a second lamination is stacked on the B-stage adhesive, which is located on the first main surface of the first lamination, thereby forming a stack of loose laminations. The stack or the adhesive in the stack is cured, thereby transferring the adhesive to a fully cured C-stage in order to bond the first and second laminations to one another and so produce the laminated core.

This printing process may be a screen printing process, a stencil printing process, a pad printing process or an ink-jet printing process.

This stacking is typically repeated a plurality of times since the laminated core typically comprises a stack of hundreds of laminations. In other words, a plurality of laminations, typically tens or hundreds or even thousands of laminations, each having the adhesive on one main surface which has been applied by printing and which is in the B-stage, are stacked such that the adhesive of one lamination is in contact with the uncoated main surface of the adjacent lamination of the stack and a stack of loose laminations is formed. This stack comprising a plurality of loose laminations is then cured so as to transfer the adhesive from the partially cured (partially cross-linked) B-stage to the fully cured (fully cross-linked) C-stage, bond the lamination to one another and form the laminated core.

According to the invention, an adhesive that can be transferred to a partially cured (partially crosslinked) stage, the so-called B-stage, is therefore used. Adhesives of this type are based on duromer resins such as epoxy resin, polyurethane resin or acrylic resin, for example.

The adhesive is applied to the laminations by means of the chosen printing process, e.g. a screen printing process, stencil printing process, pad printing process or ink-jet printing process, in the A-stage, i.e. in a fluid state, and then separated from the solvent by the introduction of heat, for example, e.g. dried and in some embodiments also partially chemically crosslinked and transferred to the B-stage. In this B-stage the exposed surfaces of the adhesive are not adhesive, and the stack can therefore initially be formed from loose laminations that can be moved relative to one another. Only later is the adhesive fully cured and transferred from the non-crosslinked or partially crosslinked stage to the fully crosslinked stage or so-called C-stage, the laminations thus being fixed together by the adhesive.

The laminated core may, for example, be used in high-performance drive systems such as electrically driven vehicles, e.g. motor vehicles, and flying vehicles such as aeroplanes, drones, etc. In these applications, high power density, high torque density and minimal losses are desirable.

The individual laminations of the laminated core have their final contour and are in a magnetically/mechanically optimum state since once the adhesive has been applied the laminations can no longer be heat treated to improve their magnetic properties. This is because the temperatures required would be above the decomposition temperature of conventional adhesives. For example, final annealing for CoFe alloys is carried out at 850° C. to 800° C. Using the printing process the adhesive can be applied carefully to the laminations in order not to impair its existing magnetic properties. With the printing process the individual layers of adhesive can also be applied evenly and as thinly as possible to ensure that the laminated core has a high fill factor.

The individual sheets, which are as thin as possible, are electrically insulated from one another in order to reduce eddy current losses. This can be achieved by a further insulating layer and/or by means of the adhesive. The adhesive itself is electrically insulating and may also have an electrically insulating filler containing ceramic particles or nanoparticles. The individual layers can be aligned exactly since the laminations are stacked with the dry and/or partially crosslinked, non-sticky adhesive in order to produce a laminated core with minimal layer misalignment.

Using the method described it is possible to bond together finally annealed individual laminations that already have their final contour. The method can be scaled up easily for large quantities. Since the adhesive is in the B-stage the individual layers can be aligned precisely before compressing and curing. As a result, there is little friction/adherence and no change in the adhesive layer if the laminations move relative to one another. The electrical insulation can be optimised by admixing corresponding fillers and additives to the adhesive. Using the printing process, it is possible to apply a predetermined and reproducible quantity of adhesive that has no adverse influence on the stacking process. In addition, laminated cores can be bonded together without adhesive running out between the layers since using the printing process with a dot pattern provides sufficient space for the adhesive to spread out between the layers. The various steps of the process can be automated. The addition of a UV marker to the adhesive permits inline process control of the adhesive application.

The conditions required to transfer the adhesive from the A-stage to the B-stage and from the B-stage to the C-stage depend on the composition of the adhesive or of the mixing or dispersion of the adhesive.

In some embodiments the partial curing is carried out at between 70° C. and 250° C. for fewer than 10 minutes in order to transfer the adhesive from the A-stage to the B-stage. In some embodiments the curing is carried out at between 70° C. and 250° C. for between 10 minutes and 8 hours to transfer the adhesive from the B-stage to the C-stage. In some embodiments a pressure is also exerted on the stack during curing. This pressure may be between 0.01 MPa and 10 MPa, preferably between 0.5 MPa and 2 MPa. This pressure may be exerted by means of a press, for example.

In some embodiments the adhesive applied to the first main surface of the first lamination in a pattern of coated and uncoated regions. For example, between 1% and 95%, preferably between 10% and 90%, of the surface may remain uncoated. The coated regions of the pattern may, for example, take the form of dots or lines. The distance between adjacent coated regions may be between 0.01 mm and 100 mm. For example, this distance may be large so that the laminations are connected to one another over very few adhesive regions. The maximum total coated area and the area of the individual regions can be selected so that the adhesive is able to spread and coat a large area during full crosslinking curing but not run out of the laminated core.

In some embodiments the adhesive has a layer thickness of 0.5 μm to 50 μm, preferably 0.5 μm to 20 μm, in the finished laminated core. A small thickness has the advantage that the fill factor of the finished laminated core is greater. The thickness of the adhesive in the applied A-stage and in the partially cured B-stage may be greater than in the finished laminated core, i.e. in the C-stage.

In some embodiments the laminations each have the contour of a stator or a rotor or of a part of a stator or a part of a rotor. For example, a stator may have a circular ring and a plurality of teeth that extend radially in the direction of the central point of the circular ring. A part of the stator may, for example, be a stator ring or a stator tooth or a segment of a stator or a part of a stator, a plurality of segments being stacked one on top of another to form the laminated core.

In some embodiments at least one of the first and the second main surfaces of the laminations has an electrically insulating layer. The electrically insulating layer may contain a ceramic, e.g. an oxide such as $Al_2O_3$, MgO or $ZrO_2$, for example.

The adhesive can be applied to the electrically insulating layer using the printing process. When stacking the laminations with the adhesive in the B-stage the adhesive on one of the laminations is brought either into contact with the electrically insulating layer on the adjacent lamination in the stack or into contact with the material of the adjacent lamination so as to arrange a layer of adhesive and at least one layer of the electrically insulating layer between adjacent laminations in the stack.

In some embodiments the method also involves the separation of the laminations from a strip, at least one side of the strip being coated with an electrically insulating layer. The electrically insulating layer may contain a ceramic, e.g. an oxide such as $Al_2O_3$, MgO or $ZrO_2$, for example. The strip is made of the CoFe alloy. The laminations may be separated from the strip by means of punching or cutting, preferably laser cutting, for example.

Once separated from the strip, the laminations are heat treated to adjust or improve their soft-magnetic properties. This heat treatment is referred to as final annealing. The heat treatment conditions can be selected according to the composition of the CoFe alloy and the desired soft-magnetic properties. For example, for a CoFe alloy made of 45 wt. %≤Co≤52 wt. %, 45 wt. %≤Fe≤52 wt. %, 0.5 wt. %≤V≤2.5 wt. %, the rest being Fe and unavoidable impurities, the laminations can be finally annealed at 840° C. to 880° C. for between 0.5 and 10 hours in a reducing atmosphere. wt. % denotes weight percent.

Various CoFe alloys can be used to produce the strip and the laminations. In some embodiments the soft-magnetic CoFe alloy comprises:

35 to 55 wt. % Co and up to 2.5 wt. % V, the rest being Fe and unavoidable impurities, or 45 wt. %≤Co≤52 wt. %, 45 wt. %≤Fe≤wt. %, 0.5 wt. %≤V≤2.5 wt. %, the rest being Fe and unavoidable impurities, or 35 wt. %≤Co≤55 wt. %, preferably 45 wt. %≤Co≤52 wt. %, 0 wt. %≤Ni≤0.5 wt. %, 0.5 wt. %≤V≤2.5 wt. %, the rest being Fe and unavoidable impurities, or 35 wt. %≤Co≤55 wt. %, 0 wt. %≤V≤2.5 wt. %, 0 wt. %≤(Ta+2Nb)≤1 wt. %, 0 wt. %≤Zr≤1.5 wt. %, 0 wt. %≤Ni≤5 wt. %, 0 wt. %≤C≤0.5 wt. %, 0 wt. %≤Cr≤1 wt. %, 0 wt. %≤Mn≤1 wt. %, 0 wt. %≤Si≤1 wt. %, 0 wt. %≤Al≤1 wt. %, 0 wt. %≤B≤0.01 wt. %, the rest being Fe and unavoidable impurities, or 5 to 25 wt. % Co, 0.3 to 5.0 wt. % V, 0 wt. %≤Cr≤3.0 wt. %, 0 wt. %≤Si≤3.0 wt. %, 0 wt. %≤Mn≤3.0 wt. %, 0 wt. %≤Al≤3.0 wt. %, 0 wt. %≤Ta≤0.5 wt. %, 0 wt. %≤Ni≤0.5 wt. %, 0 wt. %≤Mo≤0.5 wt. %, 0 wt. %≤Cu≤0.2 wt. %, 0 wt. % Nb 0.25 wt. %, the rest being Fe and unavoidable impurities auf.

In some embodiments the adhesive also comprises an electrically insulating filler, for example ceramic particles, and/or a marker, preferably a UV marker. The electrically insulating filler can be used to increase the electrical insulation between the laminations. The UV marker can be used to facilitate examination of the adhesive application.

Furthermore, the laminations with the B-staged adhesive may be aligned in the stack during or after stacking. The soft-magnetic alloy of the laminations is in the finished, finally annealed state and has its end contour before the adhesive is applied. The laminations are then aligned relative to one another. The laminations with the B-staged adhesive can be aligned relative to one another so as to give the laminated core the desired final contour. For example, after alignment the edges of the laminations can be arranged approximately in one plane, e.g. in a straight vertical plane or in an inclined plane.

In some embodiments the adhesive in arranged on the first main surface of the first lamination in such a thickness and pattern that no adhesive runs out of the edges of the stack during curing. This obviates the need for further processing of the cured laminated core in order to remove residual adhesive.

In some embodiments the curing of the stack takes place in a furnace. The furnace may be a heating sleeve, an induction coil, a convection furnace or an NIR (near infrared) furnace, for example. A plurality of stacks may be cured together.

A laminated core comprising a plurality laminations made of a soft-magnetic CoFe alloy is also provided. These laminations each have a first main surface and a second main surface that is located opposite the first main surface and are arranged in a stack. Arranged between the laminations is an adhesive with a composition that can be transferred to a B-stage and has a thickness of 0.1 μm to 10 μm, preferably 0.1 μm to 5 μm.

The adhesive can be described as a B-stageable adhesive. In some embodiments the adhesive is an epoxy resin-based adhesive. Suitable commercially available adhesives are: Remisol EB548 from Rembrandtin Lack GmbH Nfg. KG, Vienna, Austria; 124-07 SP from Creative Materials, Inc., Ayer, USA; and MagnaTAC 645 from Beacon Adhesives Mount Vernon, USA.

In some embodiments the adhesive also comprises an electrically insulating filler and/or one or more additives. In some embodiments, the electrically insulating filler comprises an inorganic material, e.g. inorganic particles.

In some embodiments at least one of the first and second main surfaces of the laminations also has an electrically insulating layer, and the adhesive is in contact with this electrically insulating layer. In some embodiments, the electrically insulating layer comprises an inorganic material. The electrically insulating layer may contain an oxide of Mg or Al or Zr, for example.

The soft-magnetic CoFe alloy may comprise:

35 to 55 wt. % Co and up to 2.5 wt. % V, the rest being Fe and unavoidable impurities, or 45 wt. %≤Co≤52 wt. %, 45 wt. %≤Fe≤52 wt. %, 0.5 wt. %≤V≤2.5 wt. %, the rest being Fe and unavoidable impurities, or 35 wt. %≤Co≤55 wt. %, preferably 45 wt. %≤Co≤52 wt. %, 0 wt. %≤Ni≤0.5 wt. %, 0.5 wt. %≤V≤2.5 wt. %, the rest being Fe and unavoidable impurities, or 35 wt. %≤Co≤55 wt. %, 0 wt. %≤V≤2.5 wt. %, 0 wt. %≤(Ta+2Nb)≤1 wt. %, 0 wt. % Zr 1.5 wt. %, 0 wt. %≤Ni≤5 wt. %, 0 wt. %≤C≤0.5 wt. %, 0 wt. %≤Cr≤1 wt. %, 0 wt. %≤Mn≤1 wt. %, 0 wt. %≤Si≤1 wt. %, 0 wt. %≤Al≤1 wt. %, 0 wt. %≤B≤0.01 wt. %, the rest being Fe and unavoidable impurities, or 5 to 25 wt. % Co, 0.3 to 5.0 wt. % V, 0 wt. %≤Cr≤3.0 wt. %, 0 wt. %≤Si≤3.0 wt. %, 0 wt. %≤Mn≤3.0 wt. %, 0 wt. %≤Al≤3.0 wt. %, 0 wt. %≤Ta≤0.5 wt. %, 0 wt. %≤Ni≤0.5 wt. %, 0 wt. %≤Mo≤0.5 wt. %, 0 wt. %≤Cu≤0.2 wt. %, 0 wt. % Nb 0.25 wt. %, the rest being Fe and unavoidable impurities.

Also disclosed is an electric machine having a laminated core according to any one of the preceding embodiments that takes the form of a stator or a rotor.

Embodiments are explained below in greater detail with reference to the drawings.

DETAILED DESCRIPTION OF EXAMPLE EMBODIMENTS

Figure 1A:
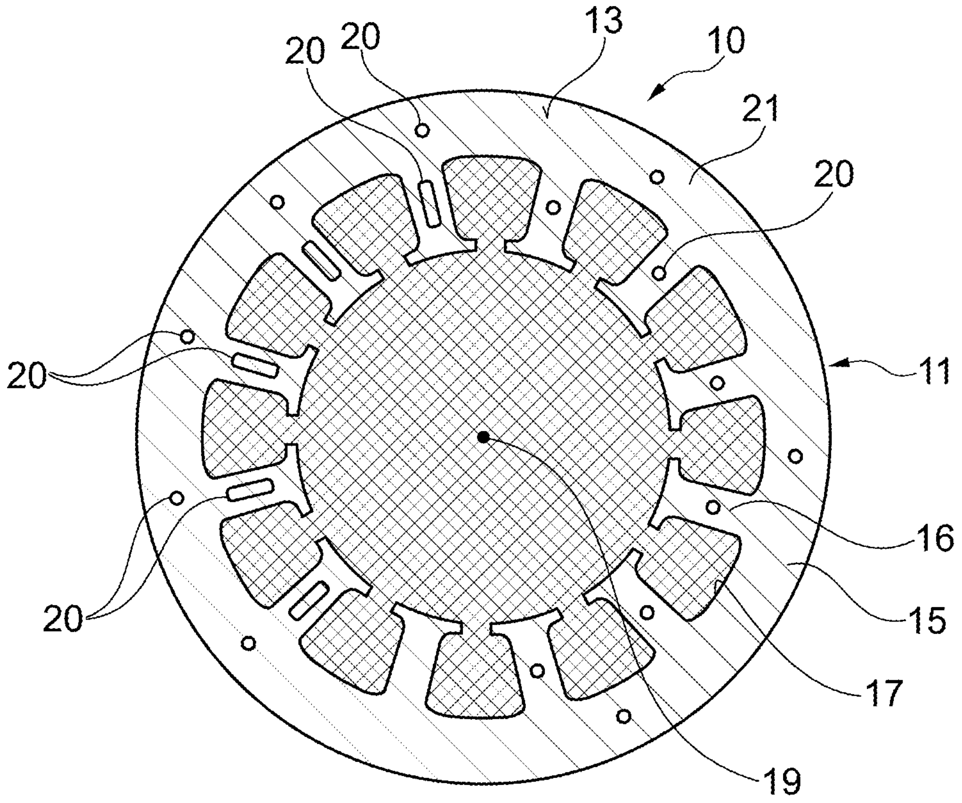
FIG. 1A shows a schematic top view of a laminated core.
Figure 1B:
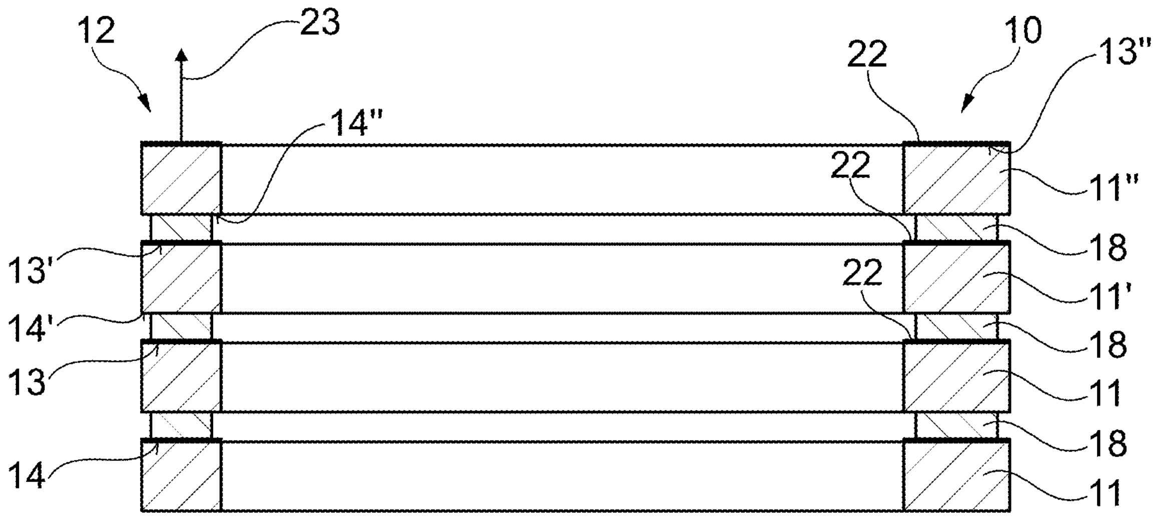
FIG. 1B shows a schematic cross section of the laminated core from FIG. 1A.

FIG. 1A shows a schematic top view and FIG. 1B shows a cross sectional view of a laminated core 10. The laminated core 10 comprises a large number of laminations 11 that are arranged in a stack 12. FIG. 1B shows four laminations 11 in cross section. However, an actual laminated core typically contains hundreds or thousands of laminations. The laminations 11 are formed of a soft-magnetic alloy such as a cobalt-iron alloy, e.g. an alloy based on 49 wt. % Co, 49 wt. % Fe and 2 wt. % V. The laminations 11 have a planar form and each have a first main surface 13 and a second main surface 14 that is located opposite the first main surface 13. The first and second main surfaces 13, 14 are approximately parallel.

In order to construct the stack in a stack direction 23 perpendicular to the first and second main surfaces 13, 14 of the laminations 11, the second main surface 14 of a first of the laminations 11 is arranged on the first main surface 13' of a second of the laminations 11' and the second main surface 14" of a third of the laminations 11" is arranged on the first main surface 13 of the first laminations 11.

The laminated core 10 also has an adhesive 18 that is arranged between the laminations 11 of the stack 12. The adhesive 18 is thus arranged between the second main surface 14 of a first lamination 11 and the first surfaces 13' of the laminations 11' below them, and these laminations 11,11' are bonded together. A layer of adhesive is arranged between adjacent laminations 11, 11' of the stack 12.

The laminated core 10 may take different forms. As shown in the top view in FIG. 1A, in this embodiment the laminations 11 have the shape of a stator and have their final contour. In the embodiment shown in FIG. 1A the laminations 11 each include an outer circular ring 15 and a large number of teeth 16 that project from the inside 17 of the ring 15 and extend in the direction of the axis 19 of the ring 15. In this embodiment the teeth 16 each have a T-shape.

The adhesive 18 has a composition that can be transferred to a B-stage. The B-stage describes an adhesive that can be dried or partially cured. In this B-stage the adhesive is no longer adhesive, i.e. it is not tacky. Epoxy resin is one example of an adhesive that can be transferred to a B-stage. Duromer resins such as polyurethane resin or acrylic resin, for example, are further adhesives that can be transferred to a B-stage. The full curing of this type of adhesive 18 is carried out in a separate second step in which the adhesive 18 is fully chemically crosslinked, in the process the laminations 11, 11' are wetted in order to produce the adhesive bond between the laminations 11, 11'.

The adhesive 18 is applied in the fluid A-stage to the first surface 13 of each lamination 11 by means of a printing process. In this embodiment the adhesive was applied by means of a screen printing process. A stencil printing process, a pad printing process or an ink-jet printing process can also be used instead of a screen printing process. The adhesive 18 can be applied over a large area of each lamination 11 or in a pattern so as to produce coated regions 20 and uncoated regions 21. The screen printing process has the advantage that the thickness of the A-stage adhesive 18 applied can be adjusted. In addition, the adhesive 18 can easily be applied to the first main surface 13 of laminations 11 in a specific pattern using a mask. Furthermore, the method is suitable for large quantities.

The laminations 11 may have a thickness of between 0.1 and 1 mm. The thickness of the adhesive 18 in the finished laminated core 10 may be between 0.10 μm und 10 μm. The thickness of the adhesive 18 is preferably small so that the laminated core 10 has a high fill factor. In addition, the thickness of the adhesive 18 in the fluid A-stage may depend on the coated surface area. For example, the thickness may be greater if the portion of the area of the lamination 11 is smaller. This ratio can be used to prevent the adhesive 18 from running out over the edges of the laminated core 10 during the first and second curing steps.

In some embodiments at least one of the first and second main surfaces 13, 14 of the laminations 11, 11' is coated with an additional electrically insulating layer 22. This additional insulating layer 22 may be polymer-free and contain ceramic particles such as MgO, $ZrO_2$ or $Al_2O_3$. This electrically insulating layer 22 may cover the surface completely or only partially. A partial coating can be used for some CoFe alloys to promote preferred texture growth. In this embodiment the adhesive 18 is applied to the electrically insulating layer 22 by means of the screen printing process.

Figure 2A:
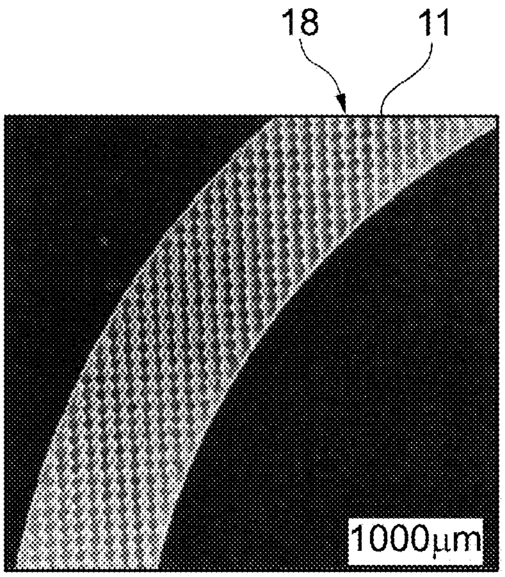
FIG. 2A shows a top view of a lamination with an adhesive pattern.
Figure 2B:
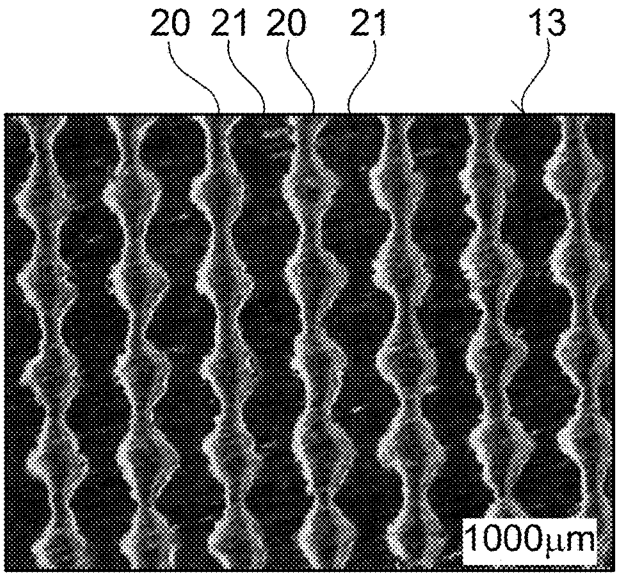
FIG. 2B shows an enlarged view of FIG. 2A.
Figure 2C:
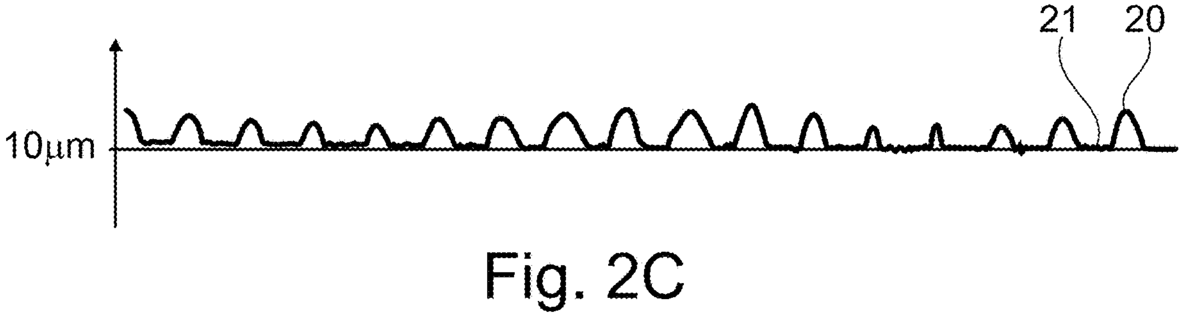
FIG. 2C shows a profile of the adhesive pattern from FIG. 2A.

FIG. 2A shows a top view of a lamination 11 according to a further embodiment in which the adhesive 18 is applied in a pattern in the fluid A-stage. As can be seen more clearly from the enlarged view in FIG. 2B, in this embodiment the pattern has coated regions 20 that are approximately stripe-shaped and narrower and broader regions that are separated from one another by uncoated regions 21 of the main surface 13. The stipe-shaped coated regions 20 run approximately parallel to one another. In other embodiments the coated regions 20 are dot-shaped or rectangular. Once applied, the adhesive 18 partially cured, e.g. at 180° C. for 1 minute for epoxy resin, to transfer the adhesive 18 to the partially crosslinked B-stage. FIG. 2C shows a profile of the adhesive pattern from FIG. 2A on the first main surface 13 of the lamination 11 in the partially crosslinked B-stage. The coated regions 20 have a thickness of less than 10 μm in the B-stage state of the adhesive 18.

Figure 3:
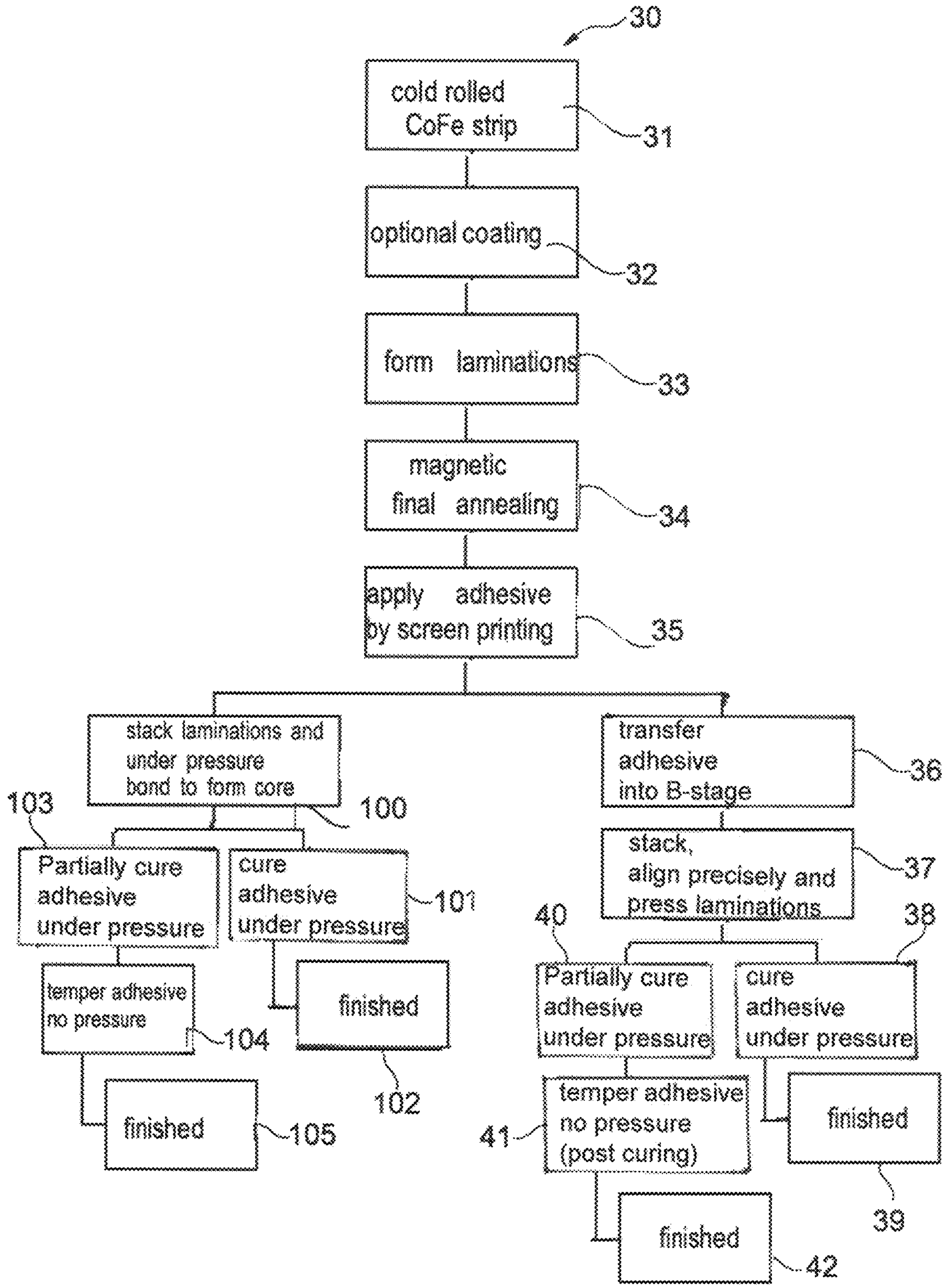
FIG. 3 shows a flow diagram of the method for the production of a laminated core.

FIG. 3 shows a flow diagram 30 of various methods for producing a laminated core that can be used to produce a laminated core according to one of the embodiments described here.

In box 31 a strip (ribbon) made of a cobalt-iron alloy is provided. This strip may be produced using a metallurgical process and is provided cold rolled. The strip may, for example, be made of VACODUR 49 (an alloy based on 49 wt. % Co, 49 wt. % Fe, 2 wt. % V). Optionally, in box 32, at least one side of the strip can be coated with an electrically insulating ceramic layer such as MgO, $Al_2O_3$ or $ZrO_2$, for example. This electrically insulating ceramic layer may be applied to the strip by means of a dipping process or a spraying process, for example. In box 33 a large number of laminations are formed from the strip by means of punching or laser cutting, for example. The laminations may have the final contour of a stator or a rotor or of a part of a stator, e.g. a stator tooth or a stator ring, or a part of a rotor. In box 34 the laminations are subjected to a heat treatment process referred to as final annealing or magnetic final annealing. During this heat treatment the magnetic properties of the laminations adjusted. For VACODUR 49 the laminations can be final annealed at 880° C. for 6 hours. In box 35 an adhesive is applied to one of the main surfaces of the laminations by means of a printing process such as screen printing. The adhesive may be contain an epoxy resin dispersion.

In box 36 the adhesive is transferred to the B-stage. The adhesive is thus dried or partially cured so as to partially cross link the polymer component of the adhesive. In this stage the adhesive is solid, and the exposed surfaces of the adhesive are no longer adhesive. In box 37, the laminations with the B-stage adhesive are stacked one on top of another so as to arrange an adhesive layer between adjacent laminations. Since the adhesive is in the B-stage and the exposed surfaces are no longer adhesive, the laminations are loose in the stack and so can be moved relative to one another and aligned relative to one another. A pressure is then exerted on the stack, e.g. the stack is pressed between two plane parallel surfaces. In one embodiment, in box 38 the adhesive is fully cured under pressure, the adhesive being transferred from the B-stage to the C-stage. This process may be carried out in a hot press, for example. For example, curing can be carried out by heat treating the stack in the hot press for 2 hours at 200° C. The pressure is them removed and the finished laminated core is provided in box 39.

Alternatively, the transfer of the adhesive from the B-stage to the C-stage can be carried out in two steps. In this embodiment, after box 37 the adhesive in the stack is firstly partially cured under pressure in box 40. The pressure is then removed in box 41, and the adhesive is fully cured without the need to exert a pressure on the stack. This method can also be termed post-curing or tempering. This method has the advantage that the mechanism used to exert the pressure on the stack need not be exposed to high temperatures. The fixed laminated core is provided in box 42.

FIG. 3 also shows two comparison methods in which the adhesive is not transferred to the B-stage before the laminations are stacked. After box 35, in box 100 the laminations are stacked on top of one another with an adhesive layer in a fluid state and a pressure is exerted on the stack. In box 101 the adhesive is fully cured under pressure and in box 102 the laminated core is finished. Alternatively, after box 100, the adhesive is partially cured under pressure in box 103, the pressure is removed, and the adhesive is fully cured in box in box 104. In box 105 the laminated core is finished.

Figure 4:
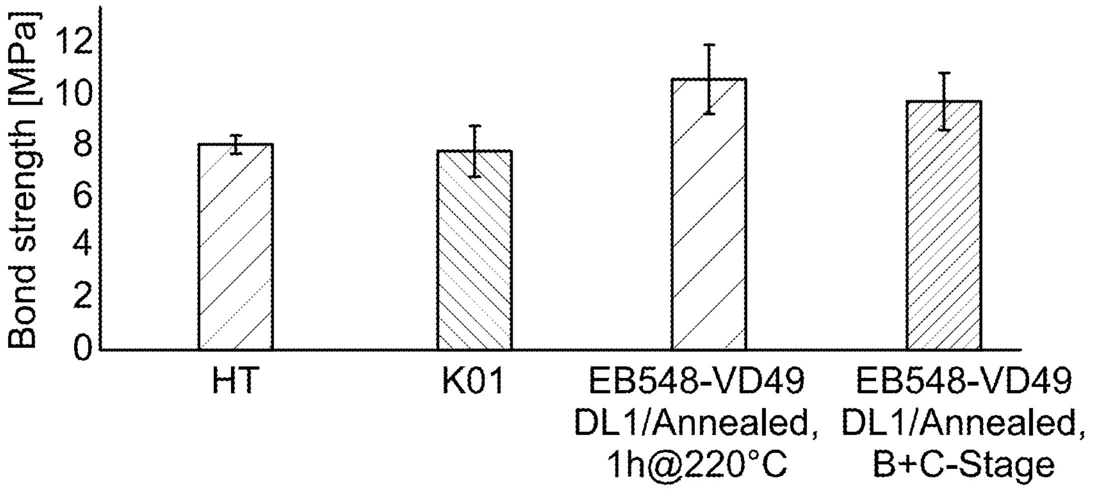
FIG. 4 shows the measured bond strength of various adhesives.

FIG. 4 shows the measured bond strength of various adhesives for shear test samples as per DIN EN 1465 and the results of bond strength tests for adhesives HT, K01 and EB 548 on laminations of the CoFe alloy VACODUR 49, coated with DL1 (a thin methylate film), which transforms into MgO particles during the heat treatment, and finally annealed. At the chosen overlap length, the bond strength of the bonding varnish used—Remisol EB 548—exceeds its material strength such that in the majority of tests the sample tears in the VACODUR 49 laminations. In contrast, the fracture behaviour of adhesives HT and K01 is exclusively adhesive, i.e. the boundary layer between the methylate film and the adhesive fails.

EXAMPLES

In one example, a method for the production of a laminated core comprises the following:

laser cutting/punching of individual laminations formed of a cobalt-iron alloy, annealing of individual laminations to restore the desired soft-magnetic properties, coating one side of the individual laminations with an adhesive (A-stage adhesive), baking the adhesive contact (and setting the B-stage of the adhesive), positioning the dry individual laminations on a device, compressing the lamination stack (still on the device) between 2 parallel surfaces (parallelism from the press, not from the stack), (partial) fast curing of the adhesive under pressure and with the introduction of heat, e.g. NIR, induction, heating sleeve, etc., removal from the device (laminated core is touch-dry), full curing of the laminated core in the furnace (batch curing).

This embodiment can be used for large quantities.

In a further example, a method for the production of a laminated core comprises the following:

laser cutting/punching of individual laminations formed of a cobalt-iron alloy, annealing of individual laminations to restore the desired soft-magnetic properties, coating one side of the individual laminations with adhesive (A-stage of the adhesive), baking the adhesive contact (and setting the B-stage of the adhesive), positioning the dry individual laminations on a device, compressing the stack of laminations (still on the device) between 2 parallel surfaces (parallelism from the press, not from the stack), curing the adhesive under pressure and with the introduction of heat (e.g. heating sleeve), removing the fully cured laminated core from the device.

As there is initially no adhesive on the lamination, the punched/lasered laminations can be annealed in order to set optimum magnetic properties. Optimum magnetic properties of the cobalt-iron alloy are particularly advantageous in applications in the field of aviation/motor racing. No adhesive is applied to the finally annealed laminations until this has been done since the punched/lasered and coated laminations cannot be re-annealed to achieve optimum magnetic properties as the annealing temperature is greater than the temperature resistance of the adhesive.

In some embodiments adhesive is already present over the entire area before stacking. This means that adhesive is present even in those regions subject to high layer pressure due to fluctuations in the strip thickness, for example. In other embodiments the adhesive is applied to parts of the area only and other parts are free of adhesive.

The adhesive may be enriched with fillers to achieve improved electrical insulation of the layers. Filler contents of over 50% can be used. The adhesive is distributed evenly either over the entire area or over predetermined parts of the area using the printing process such that all regions are wetted with adhesive. This results in high core strength.

In summary, the method permits the production of laminated cores in their final contour from magnetically optimally annealed laminations. The heat treatment of the laminations in their end contour may take place before bonding so as to ensure the desired magnetic properties. For a CoFe alloy in the 49% Fe, 49% Co, 2% V class this heat treatment, also known as final annealing, can be carried out at 800° C. to 880° C. for between 0.5 and 10 hours. Before bonding, each individual layer up to the last covering layer is coated on one side with adhesive. To ensure an even and reproducible application of adhesive that is also scalable in form and quantity, this is done by means of a printing process such as screen printing. The regions where the adhesive is applied, e.g. dots of adhesive, are typically less than 10 μm high. The printed laminations bearing the adhesive in the A-stage are dried in the furnace such that the adhesive used is partially crosslinked and forms a bonded layer, i.e. the adhesive is transferred to the B-stage. Depending on the composition of the adhesive, this can be carried out at 200° C. for less than 1 minute. The laminations can then be stacked and stored for several weeks/months. The coated and dry laminations with the B-stage adhesive regions are stacked on a device that enables the laminations to be aligned precisely. The laminations are stacked such that there is a layer of adhesive between each lamination. Since the adhesive is non-sticky in the B-stage, the individual layers can be adjusted as many times as necessary until the correct position is achieved. The stacked and aligned laminations are compressed using a press in order to achieve the required packing density/fill factor. The compressed laminated core is cured under the influence of heat. During this process the adhesive softens again, thereby enabling the wetting and spreading of the adhesive dots and achieving a further increase in fill factor. After curing the adhesive is in the fully cross-linked C-stage.

The invention claimed is:

1. A method for producing a laminated core, the method comprising the following:

providing a plurality of laminations made of a soft-magnetic CoFe alloy in a finally annealed state, each having a first main surface and a second main surface that is located opposite the first main surface;

applying an adhesive to the first main surface of a first lamination of the plurality of laminations by means of a printing process, wherein the adhesive is based on a duromer resin;

partially curing the applied adhesive to a B-stage;

stacking a second main surface of a second lamination of the plurality of laminations on the B-stage adhesive that is located on the first main surface of the first lamination, thereby forming a stack of loose laminations;

curing the stack to fully cure the B-stage adhesive to a C-stage in order to bond the first and second laminations together and so produce the laminated core.

2. The method according to claim 1, wherein the printing process comprises a screen printing process, a stencil printing process, a pad printing process, or an ink-jet printing process.

3. The method according to claim 1, wherein during curing, a pressure is exerted on the stack, and the curing is carried out at between 70° C. and 250° C. for between 10 minutes and 8 hours.

4. The method according to claim 3, wherein the pressure is between 0.01 MPa und 10 MPa.

5. The method according to claim 3, wherein the pressure is exerted by means of a press.

6. The method according to claim 1, wherein the adhesive is applied to the first main surface of the first lamination in a pattern of coated and uncoated regions.

7. The method according to claim 6, wherein the coated regions of the pattern have the form of dots or lines.

8. The method according to claim 6, wherein the distance between adjacent coated regions lies between 0.01 mm and 100 mm.

9. The method according to claim 1, wherein between 1% and 90% of the first main surface is coated with the adhesive.

10. The method according to claim 1, wherein the adhesive has a layer thickness of 0.5 μm to 50 μm.

11. The method according to claim 1, wherein the plurality of laminations each comprise a contour of a stator or a rotor.

12. The method according to claim 1, wherein at least one of the first or second main surfaces of the plurality of laminations comprises an electrically insulating layer.

13. The method according to claim 1, further comprising: separating the laminations from a strip, at least one side of this strip being coated with an electrically insulating layer.

14. The method according to claim 13, wherein the laminations are separated from the strip by means of punching or cutting.

15. The method according to claim 1, wherein the soft-magnetic CoFe alloy has a composition of: 35 to 55 wt. % Co and up to 2.5 wt. % V, the rest being Fe and unavoidable impurities, or 45 wt. %≤Co≤52 wt. %, 45 wt. %≤Fe≤52 wt. %, 0.5 wt. %≤V≤2.5 wt. %, and unavoidable impurities, or 35 wt. %≤Co≤55 wt. %, 0 wt. %≤Ni≤0.5 wt. %, 0.5 wt. %≤V≤2.5 wt. %, the rest being Fe and unavoidable impurities, or 35 wt. %≤Co≤55 wt. %, 0 wt. %≤V≤2.5 wt. %, 0 wt. %≤(Ta+2Nb)≤1 wt. %, 0 wt. %≤Zr≤1.5 wt. %, 0 wt. %≤Ni≤5 wt. %, 0 wt. %≤≤0.5 wt. %, 0 wt. %≤Cr≤1 wt. %, 0 wt. %≤Mn≤wt. %, 0 wt. %≤Si≤1 wt. %, 0 wt. %≤Al≤1 wt. %, 0 wt. %≤B≤0.01 wt. %, the rest being Fe and unavoidable impurities, or 5 to 25 wt. % Co, 0.3 to 5.0 wt. % V, 0 wt. %≤Cr≤3.0 wt. %, 0 wt. %≤Si≤3.0 wt. %, 0 wt. %≤Mn≤3.0 wt. %, 0 wt. %≤Al≤3.0 wt. %, 0 wt. %≤Ta≤0.5 wt. %, 0 wt. %≤Ni≤0.5 wt. %, 0 wt. %≤Mo≤0.5 wt. %, 0 wt. %≤Cu≤≤0.2 wt. %, 0 wt. %≤Nb≤0.25 wt. %, the rest being Fe and unavoidable impurities.

16. The method according to claim 1, wherein the adhesive further comprises an electrically insulating filler and/or a marker.

17. The method according to claim 1, further comprising aligning the plurality of laminations in the stack.

18. The method according to claim 1, wherein the adhesive is arranged on the first main surface of the first lamination in such a thickness and pattern that no adhesive runs out between the edges of the stack during curing.

19. The method according to claim 1, wherein the curing of the stack is carried out in a furnace.

20. The method according to claim 19, wherein the furnace is a heating sleeve, an induction coil, a convection furnace or an NIR furnace.

21. The method according to claim 1, wherein the adhesive comprises an epoxy resin-based adhesive or a polyurethane resin-based adhesive or an acrylic resin-based adhesive.

* * * * *